US011687562B2

(12) United States Patent
Chung et al.

(10) Patent No.: US 11,687,562 B2
(45) Date of Patent: Jun. 27, 2023

(54) APPARATUS AND METHOD FOR ADAPTIVELY MANAGING SHARDED BLOCKCHAIN NETWORK BASED ON DEEP Q NETWORK

(71) Applicant: INDUSTRY-ACADEMIC COOPERATION FOUNDATION, YONSEI UNIVERSITY, Seoul (KR)

(72) Inventors: Jong-Moon Chung, Seoul (KR); Ju Sik Yun, Seoul (KR); Yun Yeong Goh, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 17/406,056

(22) Filed: Aug. 18, 2021

(65) Prior Publication Data

US 2022/0067063 A1  Mar. 3, 2022

(30) Foreign Application Priority Data

Aug. 27, 2020  (KR) .......................... 10-2020-0108628

(51) Int. Cl.
  *G06F 16/00*  (2019.01)
  *G06F 16/27*  (2019.01)
(52) U.S. Cl.
  CPC .................................. *G06F 16/27* (2019.01)
(58) Field of Classification Search
  CPC ...................................................... G06F 16/27
  See application file for complete search history.

(56) References Cited

U.S. PATENT DOCUMENTS

| | | | | |
|---|---|---|---|---|
| 2019/0140935 A1* | 5/2019 | Kikinis | ................. | G06F 16/182 |
| 2021/0240733 A1* | 8/2021 | Kramer | ................. | H04L 9/3239 |
| 2021/0365943 A1* | 11/2021 | Buldas | ................. | G06Q 20/405 |
| 2021/0385065 A1* | 12/2021 | Syed | ..................... | H04L 9/0869 |
| 2022/0027348 A1* | 1/2022 | Manevich | ............... | H04L 9/085 |

FOREIGN PATENT DOCUMENTS

| | | |
|---|---|---|
| KR | 10-2019-0067581 A | 6/2019 |
| KR | 10-2020-0083145 A | 7/2020 |

OTHER PUBLICATIONS

Jusik Yun et al., "DQN-Based Optimization Framework for Secure Sharded Blockchain Systems", IEEE Internet of Things Journal, vol. 8, No. 2, Jan. 15, 2021 (Early Access on Jul. 3, 2020).

* cited by examiner

*Primary Examiner* — Khanh B Pham (57) ABSTRACT

An apparatus for managing sharded blockchain network obtains state information including an inter-node data transmission rate and computing resources of each node in the current epoch of a shard-based blockchain network in which N nodes are distributed to at least one shard, a consensus process record of each node in each shard and a ratio of malicious nodes, estimates at least one action each including block size, block interval and number of shards corresponding to the state information by using an artificial neural network in which a pattern estimation method has been previously learned, selects one action among the estimated at least one action and applies the one action to the shard-based blockchain network.

19 Claims, 5 Drawing Sheets

DRAWINGS

APPARATUS AND METHOD FOR ADAPTIVELY MANAGING SHARDED BLOCKCHAIN NETWORK BASED ON DEEP Q NETWORK

CROSS-REFERENCE TO RELATED APPLICATIONS

This application claims priority under 35 U.S.C. § 119(a) to Korean Patent Application No. 10-2020-0108628, filed on Aug. 27, 2020, in the Korean Intellectual Property Office, the disclosure of which is incorporated herein in its entirety by reference.

BACKGROUND

1. Technical Field

The present disclosure relates to an apparatus and method for managing sharded blockchain network, more particularly to an apparatus and method for managing sharded blockchain network that can adaptively improve the transaction processing speed according to network conditions while maintaining security based on deep reinforcement learning.

2. Description of the Related Art

A blockchain relates to a decentralized distributed transaction management technology that was developed to break away from previous centralized storage methods in which the transactions of a centralized institution were stored at a single position. In a blockchain, the transactions and transactional ledgers are examined by all verifier nodes by way of a P2P (peer-to-peer) system, and if agreed upon by majority (more than half) of the nodes, each verification node stores the corresponding transaction block in the form of a hash-chain. As a technology for distributed data storage, the blockchain was conceived to make it impossible for a malicious administrator to manipulate data or transactions. Blockchain technology is currently mainly used in cryptocurrency. To manipulate data on the blockchain, it is necessary to modify all of the blocks of the majority of the nodes participating as verifiers within a limited time, so it is known that the data manipulation is practically impossible.

However, due to the low processing rate for the transactions (or transactions per second: hereinafter referred to as TPS) resulting from each of the multiple nodes having to verify a block, it is difficult to apply in a network involving a large number of users who generate large-scale data, such as the Internet of Things (IoT). In other words, if a large user group, such as IoT, participates in the consensus process, the TPS decreases due to the complexity in the authentication process that connects the block to the chain, and as the size of the ledger increases and the size of the blockchain increases, scalability problems arise, making it difficult to manage the blockchain in a distributed way.

In addition, with the use of 5G communication and the rapid growth of IoT devices, in order to process a large amount of large-scale data transactions in an IoT network, reliable performance with high TPS is essential. Therefore, future blockchain systems that support IoT networks should have better scalability than existing blockchain systems.

However, the blockchain using the proof of work (PoW) algorithm, which is an existing representative consensus algorithm, has a low processing speed of 7~10 TPS. This low TPS is not suitable for data processing in IoT networks. In particular, the proof of work algorithm consumes a lot of energy and time because it requires repeated hash operations.

Accordingly, a method of reducing the computational cost of complex hash operations has been proposed and is currently mainly used, by replacing the PoW algorithm with a Proof of Stake (hereinafter referred to as PoS) or Practical Byzantine Fault Tolerance (hereinafter referred to as PBFT) algorithm scheme.

Meanwhile, in addition to the above-mentioned consensus algorithm, various solutions for solving the scalability problem of the blockchain system have been studied, which can be broadly divided into on-chain solutions and off-chain solutions.

Among them, the on-chain solution uses a method to improve TPS by adjusting blockchain variables such as block size, block generation cycle, block generator, etc. For example, in the on-chain solution, by reducing the number of nodes participating in consensus, the TPS can be improved by reducing message complexity and shortening the time to reach consensus. In particular, in the sharding technique, by introducing the concept of parallel processing of transactions, the blockchain verification nodes are arbitrarily distributed into several shard groups, and multiple shards each process transactions in parallel so that the TPS is improved in proportion to the number of shards. However, in the case of the sharding technique, the security level can be reduced because there is a problem that it becomes easier for malicious nodes to occupy the majority in one shard.

According to the blockchain trilemma, a blockchain system can have only two of the three characteristics (decentralization, security, and scalability) of the blockchain. That is, when one characteristic is maximized, the other characteristics are rapidly decreased.

Therefore, there is a need for a method that can improve the scalability of the blockchain by improving the TPS while maintaining or improving security.

SUMMARY

An object of the present disclosure is to provide an apparatus and method for managing sharded blockchain network that can improve the scalability by improving the transaction processing speed of the blockchain network.

Another object of the present disclosure is to provide an apparatus and method for managing sharded blockchain network that can maintain or improve security while improving the scalability of the blockchain network.

An apparatus for managing sharded blockchain network according to an embodiment of the present disclosure, conceived to achieve the objectives above, obtains state information ($S^t$) including an inter-node data transmission rate (R) and computing resources (c) of each node in the current epoch (t) of a shard-based blockchain network in which N nodes are distributed to at least one shard, a consensus process record (H) of each node in each shard and a ratio of malicious nodes ($\bar{p}$), estimates at least one action (A) each including a block size (B), a block interval ($T^r$) and the number of shards (K) corresponding to the state information ($S^t$) by using an artificial neural network in which a pattern estimation method has been previously learned, and selects one action ($A^r$) among the estimated at least one action (A) and applies the one action ($A^r$) to the shard-based blockchain network which one action ($A^r$) maximizes a processing speed (transactions per second: hereinafter referred to as TPS) while satisfying the first constraint that the latency ($T_{latency}$) is less than or equal to the successive block interval ($uT^t$) and the second constraint that the number of shards (K) is within the pre-designated maximum number of secure shards ($\hat{K}$) required to maintain security.

The latency ($T_{latency}$) can be calculated as a sum of the block interval ($T^t$) and a total consensus time ($T^k_{con}$) consumed in a sharded blockchain network having k shard blocks, and the total consensus time ($T^k_{con}$) can be calculated as a sum of a intra-shard consensus time ($T^k_{intra}$) and the final shard consensus time ($T^k_{final}$).

The intra-shard consensus time ($T^k_{intra}$) can be calculated as a sum of a message propagation time ($T^k_{in\_prop}$) in the intra-shard consensus process and a verification time ($T^k_{in\_val}$) in the intra-shard consensus process, and the final shard consensus time ($T^k_{final}$) can be calculated as a sum of a message propagation time ($T^k_{f\_prop}$) in the final consensus process and a verification time ($T^k_{f\_val}$) in the final consensus process.

The shard-based blockchain network can perform consensus according to the practical Byzantine fault tolerance algorithm technique.

The maximum number of security shards ($\hat{K}$) may be set to a maximum value among values smaller than each of the first security condition ($S_1$) indicating the number of shards that makes the ratio of malicious nodes in each shard less than ⅓ and the second security condition ($S_2$) indicating the number of shards that makes the ratio of malicious nodes in each shard less than ⅔.

The apparatus for managing sharded blockchain network may include: an agent unit that estimates a plurality of actions (A) corresponding to the state information ($S^t$) by comprising an artificial neural network in which a pattern estimation method has been previously learned, satisfies the first and second constraint conditions among the estimated plurality of actions (A), and selects an action ($A^t$) that maximizes TPS; and an environment analysis unit that applies the selected action ($A^t$) to the sharded blockchain network to estimate the state information ($S^{t+1}$) and a reward ($R^t$) in the next epoch (t+1).

The apparatus for managing sharded blockchain network may further include a memory unit in which the state information ($S^t$), the selected action ($A^t$), and the state information ($S^{t+1}$) and the reward ($R^t$) at the next epoch (t+1) according to the selected action ($A^t$) are matched and stored as a transition set ([$S^t, A^t, R^t, S^{t+1}$]), sample, in a pre-designated manner, a minibatch of a plurality of transition sets ([$S^x, A^x, R^x, S^{x+1}$]) stored in the memory unit during learning of the agent unit, estimate a loss based on a reward ($R^x$) of the sampled transition set and a TPS difference by the action ($A^x$, A') selected according to each state information ($S^x, S^{x+1}$), and backpropagate the estimated loss.

A method for managing sharded blockchain network according to another embodiment of the present disclosure, conceived to achieve the objectives above, includes the steps of: obtaining state information ($S^t$) including an inter-node data transmission rate (R) and computing resources (c) of each node in the current epoch (t) of a shard-based blockchain network in which N nodes are distributed to at least one shard, a consensus process record (H) of each node in each shard and a ratio of malicious nodes ($\bar{p}$); estimating at least one action (A) each including a block size (B), a block interval ($T^t$) and the number of shards (K) corresponding to the state information ($S^t$) by using an artificial neural network in which a pattern estimation method has been previously learned; selecting one action ($A^t$) among the estimated at least one action (A) which one action ($A^t$) maximizes a processing speed (transactions per second: hereinafter referred to as TPS) while satisfying the first constraint that the latency ($T_{latency}$) is less than or equal to the successive block interval ($uT^t$) and the second constraint that the number of shards (K) is within the pre-designated maximum number of secure shards ($\hat{K}$) required to maintain security; and applying the block size (B), block interval ($T^t$) and number of shards (K*) of the selected action ($A^t$) to the shard-based blockchain network.

Accordingly, the apparatus and method for managing sharded blockchain network according to an embodiment of the present disclosure, can improve processing performance while maintaining security even in the presence of malicious nodes, by being learned based on deep reinforcement learning and adjusting the block size, block interval, and number of shards according to the network situation. Therefore, it is possible to improve the scalability of the blockchain network, so that the blockchain can be easily used even in environments, such as IoT networks, where large-scale transactions must be processed.

DETAILED DESCRIPTION

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

Figure 1:
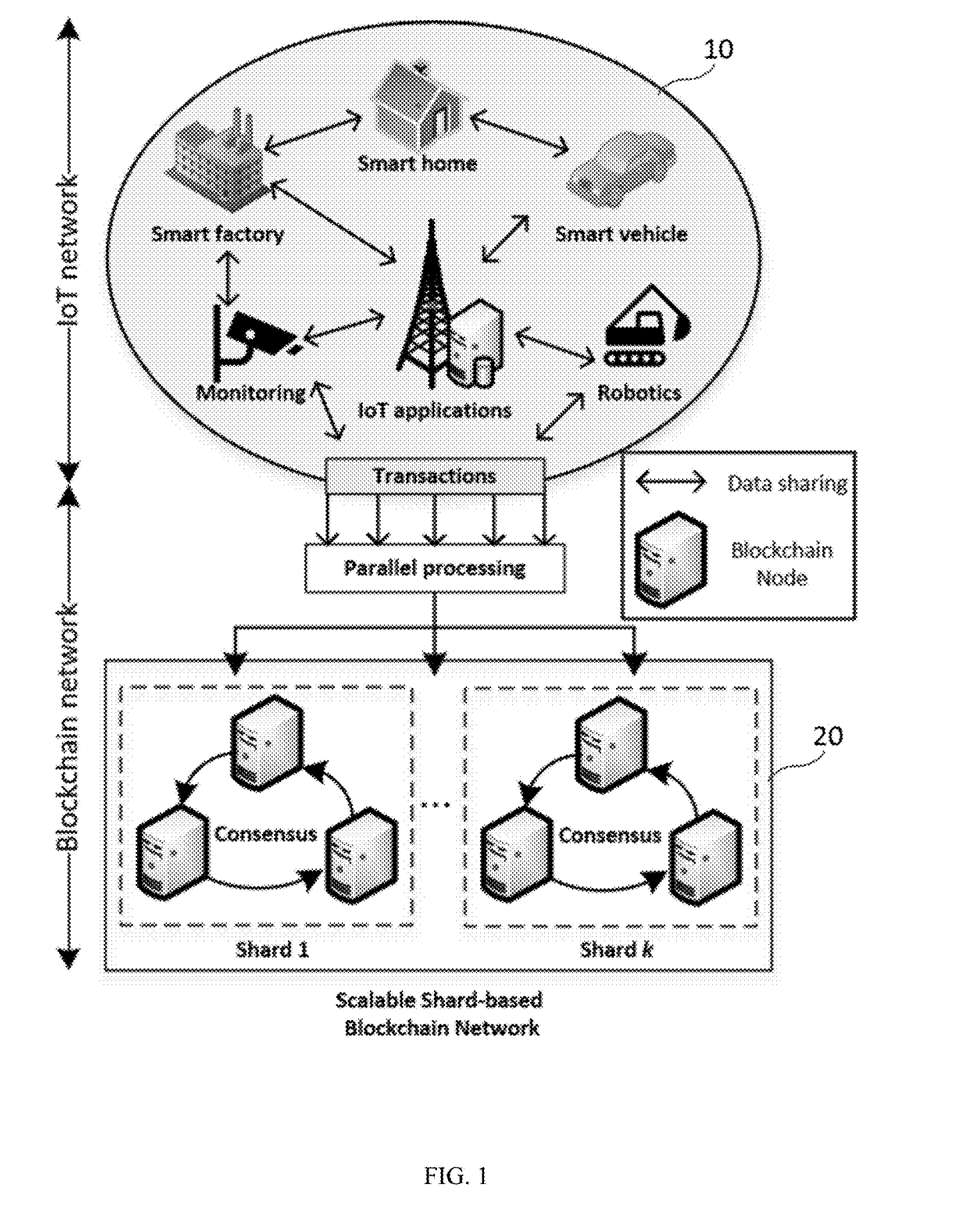
FIG. 1 shows a schematic structure of a shard-based blockchain network in an IoT network environment.

FIG. 1 shows a schematic structure of a shard-based blockchain network in an IoT network environment.

Referring to FIG. 1, in an IoT network 10 in which various IoT devices such as a smart home, a smart vehicle and the like are disposed, each device performs a designated operation, and generates various transaction data by communicating with each other. The generated transactions may be shared with each other in each domain through the blockchain network 20.

The blockchain network 20 receives a transaction from the IoT network 10 and records it in a block serving as a distributed ledger for reliable data management. However, since a large amount of transactions are applied from the IoT network 10, it should be able to process the applied transactions quickly. That is, the transaction processing speed (Transactions Per Second: hereinafter referred to as TPS) should be improved.

Accordingly, the blockchain network 20 may be configured as a shard-based blockchain network that processes a large amount of transactions applied from the IoT network 10 in parallel.

As shown in FIG. 1, the shard-based blockchain network 20 can improve TPS by distributing multiple nodes into multiple shards (shard 1~shard K), dividing multiple transactions in each distributed shard and processing them in parallel.

In the process of processing a transaction in the sharded blockchain network 20, firstly, multiple nodes corresponding to blockchain validators are distributed into multiple shards (shard 1~shard K). And in each shard (shard 1~shard K), validators independently create blocks through intra-shard consensus and verify the integrity of the blocks. After that, the blocks generated in each shard are merged through the final consensus, and the new merged block is connected to the blockchain.

The multiple nodes of the blockchain network 20 may basically function as verification nodes that verify the validity of the block as described above, and at least one node among the multiple nodes may function as a network management device.

In the present embodiment, a node functioning as a network management device can improve the TPS of the blockchain network 20 according to the state of the blockchain network 20, and manage such that the security of the blockchain network can be maintained or further improved although the TPS is improved. In other words, the scalability of the blockchain network can be improved by optimizing the blockchain network. In particular, the apparatus for managing network according to the present embodiment can adaptively optimize and manage the blockchain network according to the state of the blockchain network, by being learned by the deep reinforcement learning method.

In the above description, the IoT network 10 and the blockchain network 20 are divided for convenience of explanation, however a plurality of IoT devices of the IoT network 10 may operate as nodes of the blockchain network 20.

Figure 2:
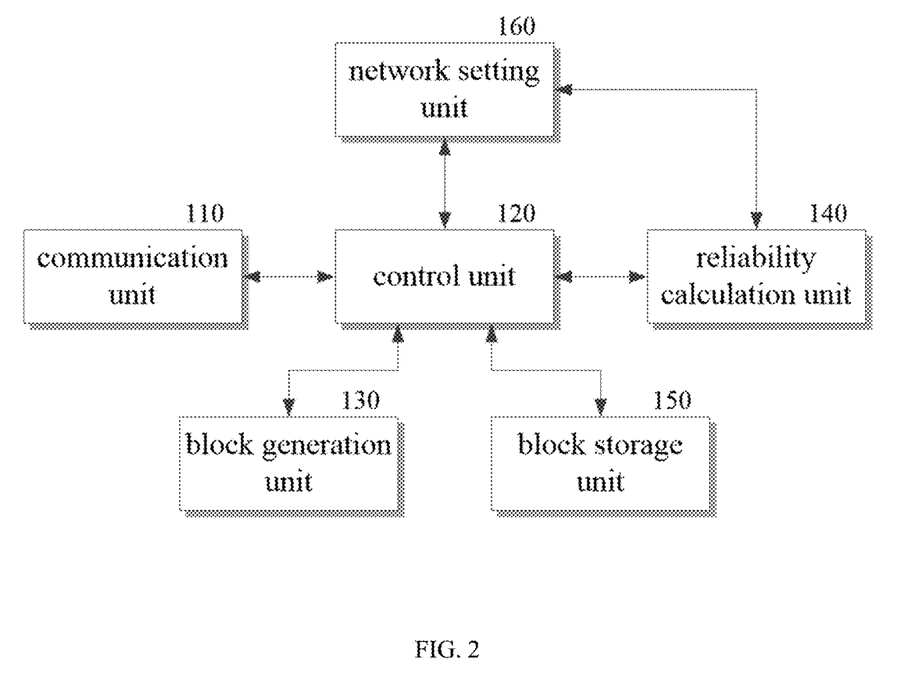
FIG. 2 shows a schematic structure of an apparatus for managing network according to an embodiment of the present disclosure.

FIG. 2 shows a schematic structure of an apparatus for managing network according to an embodiment of the present disclosure.

Referring to FIG. 2, an apparatus for managing network according to the present embodiment may include a communication unit 110, a control unit 120, a block generation unit 130, a reliability calculation unit 140, a block storage unit 150, and a network setting unit 160.

The communication unit 110 enables the apparatus for managing network to communicate with other nodes on the blockchain network. And, the control unit 120 not only controls each component of the node to transmit data internally between each components, but also controls the communication unit 110 to transmit and receive data to and from other nodes.

The block generation unit 130 may collect, record, and verify transactions that have to be processed and may thus generate a block, when the node is selected as a block generator. Here, if the multiple nodes have already been distributed to the multiple shards, the block generation unit 130 can generate a block by collecting the transactions that have to be processed by the shard to which the corresponding node belongs. The generated block may be propagated to the blockchain network by way of the communication unit 110.

The block generator can be selected according to a proof of work (PoW) or a proof of stake (PoS) technique. In the proof of work (PoW) technique, all of the verification nodes perform a procedure for finding a hash value below a particular difficulty prior to generating each block, and the node that has proposed the lowest hash value from among the hash values below a particular difficulty is selected as the block generator. Here, the generated block undergoes a consensus procedure by the multiple nodes of the blockchain network and, if a consensus of a majority is achieved, is pronounced a final block, to be connected to the blockchain previously stored at each node.

The proof of stake (PoS) technique is a technique proposed to reduce the excessive hash computation load required by the proof of work (PoW) technique and entails selecting the block generator according to the stake held by each node and how long a duration the stake was held. If all of the nodes have the same stakes and stake holding durations, then the block generator can be selected randomly with the same probability for the multiple nodes.

In this embodiment, the block generator may be selected using a proof of work (PoW) or proof of stake (PoS) technique or other techniques, however it is assumed here as an example that the block generator is determined based on the proof of work (PoW) technique.

The reliability calculation unit 140 may verify the validity of the block generated and propagated by the node selected as the block generator and may decide whether or not to approve the block by also considering the block verification results of the other nodes to determine the block consensus result. Here, if the node is included in a particular shard, then the reliability calculation unit 140 can receive the block generated by the block generator of the corresponding shard and the block verification results of the other nodes.

The block storage unit 150 may receive and store the block that has been determined to be valid by the reliability calculation unit 140. Here, the block storage unit 150 may store the received block by connecting it to the previously stored blockchain. The stored blockchain can be propagated to the other nodes of the blockchain network.

The above describes the composition when a node serves as a validator for verifying the validity of a proposed block in the blockchain network. However, as described above, at least one of the multiple nodes of the blockchain network may also function as a network manager, and may also function as a shard manager for a specific shard.

In cases where the node is a shard manager, the reliability calculation unit 140 may receive reliability obtained from the multiple nodes included in a shard to obtain a local consensus result and, based on the obtained local consensus result, may obtain the average reliability for each node.

Meanwhile, in cases where the node is a network manager, the node may further include a network setting unit 160. Here, the network setting unit 160 may set an action (A)

for managing the blockchain network based on the state (S) of the blockchain network 20 collected through the communication unit 110. Here, the network setting unit 160 may be implemented including an artificial neural network that is pre-learned in a deep reinforcement learning (DRL) method. For example, in this embodiment, the network setting unit 160 may be configured to include a deep Q network module that is learned by the DRL method among artificial neural networks.

The network setting unit 160 may collect the inter-node data transmission rate (R) of the blockchain network 20, the computing resources (c) of each node, and the consensus process record (H) of each node in each shard, as the state information (S) of the blockchain network 20, and estimate the malicious node probability ($\mathcal{P}$). That is, the data transmission rate (R), computing resource (c), consensus process record (H) and malicious node probability ($\mathcal{P}$) are included in the state information (S=[R, c, H, $\mathcal{P}$]).

In the blockchain network 20, there may be N nodes (n) as validators, and the N nodes may be distributed into k shards according to the sharding technique. After the shard configuration is completed, in the blockchain network 20, block consensus of multiple nodes should be performed during an epoch period indicating a defined period for which consensus is to be performed. In order to prevent a specific node from participating in a specific shard for a long time, the shard can be reconfigured every epoch period.

The transmission rate ($R_{i,j}$) between the i-th node ($n_i$) and the j-th node ($n_j$) in the t-th epoch can be quantized to H levels (R={$R_1$, $R_2$, ..., $R_H$}) based on the finite-state Markov channel model, and a state transition probability matrix ($[p_R(t)]_{H \times H}$) can be calculated as $p_\mathcal{R}(t)$=Pr[$R_{i,j}(t+1)=\mathcal{R}_b | R_{i,j}(t)=\mathcal{R}_n$] with a size of H×H.

The network setting unit 160 may obtain the data transmission rate (R), the computing resources (c), the consensus process record (H) and the malicious node probability ($\mathcal{P}$), as the state information (S) of the blockchain network 20 and, based on the obtained state information (S), may determine an action (A) for optimizing the blockchain network 20 according to a pre-learned method. Here, the network setting unit 160 may determine the action (A) to improve the scalability of the blockchain network 20 by improving the time delay and TPS while maintaining security, so that the blockchain network 20 can be optimized even in various environmental changes. The action (A=[B, $T^t$, K*]) that the network setting unit 160 determines to optimize the blockchain network 20 may include the block size (B), the block interval ($T^t$), and the number of shards (K*).

The network setting unit 160 may distribute multiple nodes on the blockchain network 20 to a determined number (K*) of shards, and the distributed multiple nodes of the shard blocks may transmit the block according to the determined block size (B) and block interval ($T^t$).

Accordingly, the current state information ($S^t$) of the blockchain network 20 is changed to a new next state information ($S^{t+1}$) by the determined action ($A^t$), and the network setting unit 160 may observe the changed next state information ($S^{t+1}$) and a reward ($R^t$) according to the next state information ($S^{t+1}$).

That is, the network setting unit 160 determines the block size (B) to be transmitted between nodes, the block interval ($T^t$) and the number of shards (K*) to which the multiple nodes are to be distributed to be included in the action ($A^t$=[B, $T^t$, K*]$^t$) of the blockchain network 20, based on the data transmission rate (R), computing resources (c), the consensus process record (H) and the malicious node probability ($\mathcal{P}$) included in the state information ($S^t$=[R, c, H, $\mathcal{P}$]$^t$) in the current epoch (t) among epochs which is a unit representing a pre-defined period for the blockchain network 20 to reach consensus. And by observing the state information ($S^{t+1}$) and the reward ($R^t$) in the next epoch (t+1) according to the determined action ($A^t$) and determining the next action ($A^{t+1}$), the blockchain network 20 can be optimized.

Figure 3:
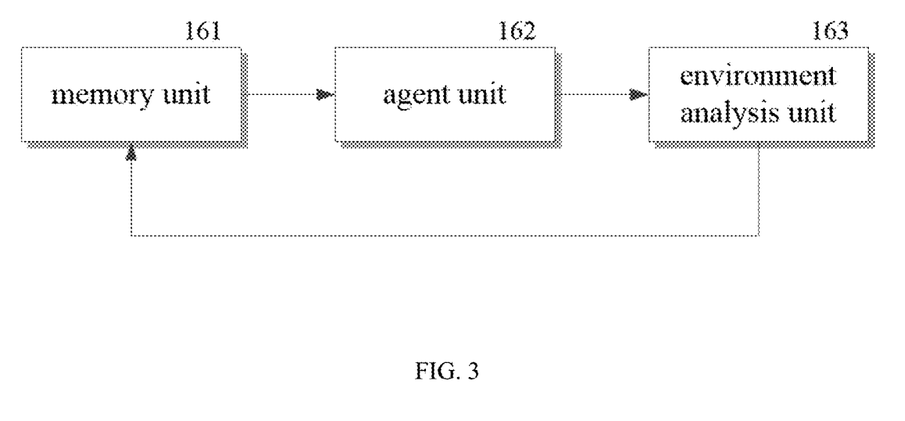
FIG. 3 shows a schematic structure of a network setting unit of FIG. 2.
Figure 4:
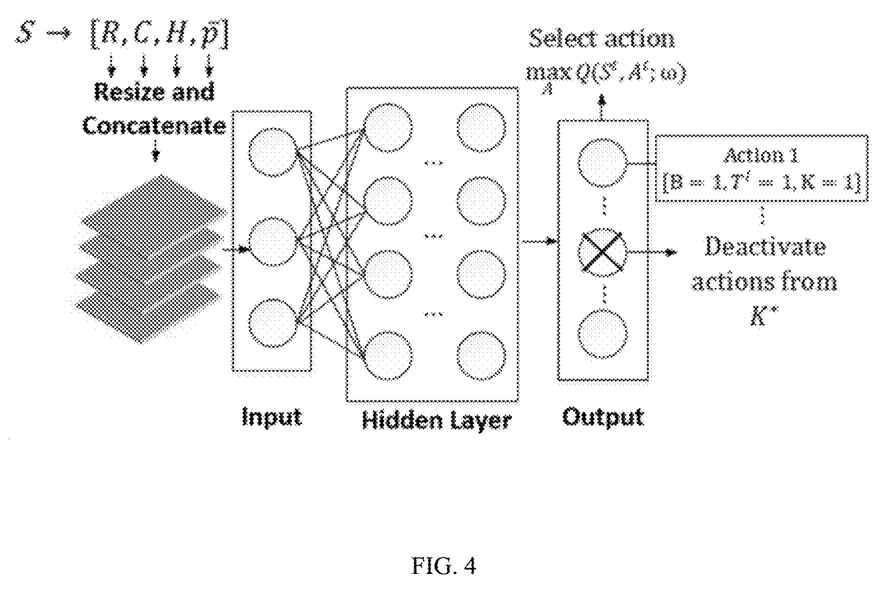
FIG. 4 shows an example of an artificial neural network constituting an agent unit of FIG. 3.

FIG. 3 shows a schematic structure of a network setting unit of FIG. 2, and FIG. 4 shows an example of an artificial neural network constituting an agent unit of FIG. 3.

As described above, in the apparatus for managing network according to the present embodiment, the network setting unit 160 may be implemented including an artificial neural network that is learned in a deep reinforcement learning method. Referring to FIG. 3, the network setting unit 160 may include a memory unit 161, an agent unit 162 and an environment analysis unit 163.

The memory unit 161 may store multiple state information ($S^t$=[R, c, H, $\mathcal{P}$]$^t$) including the inter-node data transmission rate (R), computing resources (c) of each node, consensus process record (H) and malicious node probability ($\mathcal{P}$), as an environment of the blockchain network 20.

And the memory unit 161 may match and store the action ($A^t$=[B, $T^t$, K*]$^t$) including the block size (B), the block interval ($T^t$) and the number of shards (K*) determined by the agent unit 162 in response to each of multiple state information (S).

In addition, in the memory unit 161, state information ($S^t$) at a specific epoch (t), state information ($S^{t+1}$=[R, c, H, $\mathcal{P}$]$^{t+1}$) in the next epoch (t+1) determined by the environment analysis unit 163 by the action ($A^t$) determined corresponding thereto, and a reward ($R^t$) corresponding to the next state information ($S^{t+1}$) may be stored together.

That is, the memory unit 161 may match and store together the state information ($S^t$) of the blockchain network 20 at each epoch interval, the corresponding action and next state information ($S^{t+1}$) and reward ($R^t$) according to the action ($A^t$). Here, the state information ($S^t$), the action ($A^t$), the next state information ($S^{t+1}$), and the reward ($R^t$) matched and stored together in the memory unit 161 are referred to as a transition set.

As shown in FIG. 4, the agent unit 162 may be implemented as an artificial neural network learned in a reinforcement learning method and may determine an action ($A^t$) corresponding to the state information ($S^t$) at a specific epoch (t) applied from the memory unit 161. The agent unit 162 estimates and outputs the optimal block size (B), block interval ($T^t$) and number of shards (K*) according to the learned pattern estimation method for the inter-node data transmission rate (R), the computing resources (c) of each node, the consensus process record (H) and the malicious node probability ($\mathcal{P}$) included in the state information ($S^t$).

The agent unit 162 may convert and concatenate the data transmission rate (R), the computing resources (c), the consensus process record (H) and the malicious node probability ($\mathcal{P}$) into a pre-designated size, receive them as input data, and estimate and output at least one action (A) including a block size (B), a block interval ($T^t$) and number of shards (K) corresponding to the input data.

In addition, the agent unit 162 may select one action (A$^t$) from among the estimated at least one action (A), according to Equation 1.

$$\max_{A} Q(S, A) \quad \text{[Equation 1]}$$

(wherein, Q is an action-value function indicating an action performed by the agent unit 162, and is a function that outputs the value of each of multiple actions (A) that can be determined in the agent unit 162 in response to the state information (S).)

Here, the agent unit 162 may select an action (A$^t$) corresponding to the state information (S$^t$) in the current epoch (t) as $$\max_{A} Q(S^t, A^t; \omega)$$

by additionally applying a pre-designated weight (o) by learning.

The environment analysis unit 163 may be implemented as a pre-learned artificial neural network, and estimate the next state information (S$^{t+1}$) and the reward (R$^t$) corresponding to the next state information (S$^{t+1}$) based on the state information (S$^t$) in the current epoch (t) and the action (A$^t$) determined by the agent unit 162 according to the state information (S$^t$).

The apparatus for managing network of the present embodiment aims to improve the scalability of the blockchain network 20 by maximizing the processing speed (transactions per second: hereinafter referred to as TPS) of the blockchain network 20, and the TPS(T) of the blockchain network can be calculated according to Equation 2.

$$\mathcal{T}(B, T^I) = \frac{k \lfloor B/b \rfloor}{T^I} \quad \text{[Equation 2]}$$

(wherein, k represents the number of shards, b represents the average transaction size, and $\lfloor \ \rfloor$ represents the floor function.) That is, the agent unit 162 is learned to determine the action (A$^t$) which maximizes the TPS according to Equation 2 among multiple actions (A) which can be determined in response to the state information (S$^t$).

However, if the agent unit 162 simply maximizes the TPS, there is a possibility that latency (T$_{latency}$) or security may be reduced, the latency (T$_{latency}$) indicating the time from when a transaction is applied to the blockchain network until it goes through a consensus process and becomes irreversible.

Accordingly, the environment analysis unit 163 adds two constraints of the latency (T$_{latency}$) and the maximum number of security shards ($\dot{K}$) required to maintain two pre-designated security conditions (S$_1$, S$_2$), such that the agent unit 162 determines the action (A$^t$) while satisfying two constraint conditions as Equation 3.

Objective: $\max_{A} Q(S, A)$ [Equation 3]

Constraint 1: $T_{latency} = T^I + T^k_{con} \leq u T^I$

Constraint 2: $\dot{K} < S_l, l = 1, 2$ (wherein, T$^k_{con}$ represents the total consensus time consumed in a sharded blockchain network having k shard blocks; u represents a continuous block interval; and the two security conditions (S$_l$, l=1,2) represent a constraint to maintain security when the sharded blockchain network performs consensus according to the Practical Byzantine Fault Tolerance (hereinafter PBFT).)

Figure 5:
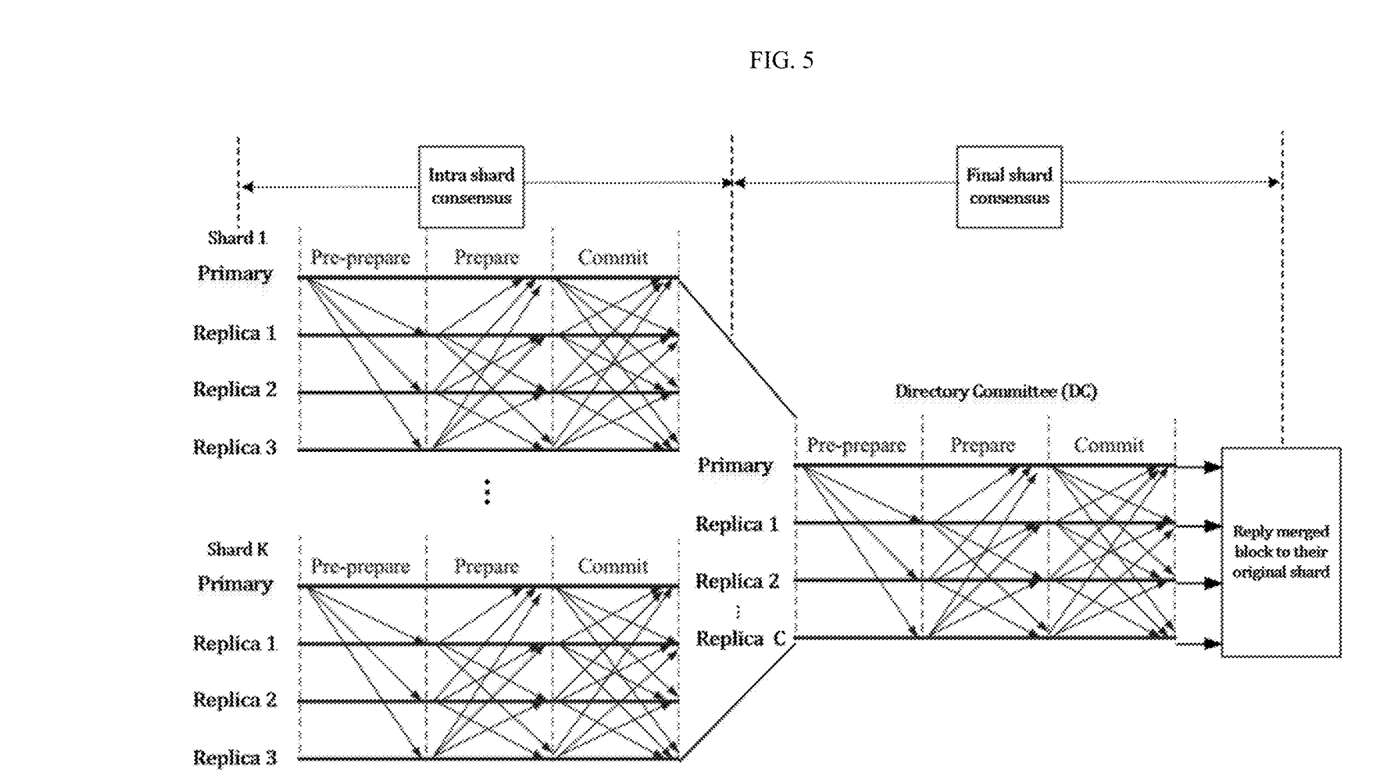
FIG. 5 a diagram for explaining a consensus process of a sharded blockchain network.

FIG. 5 a diagram for explaining a consensus process of a sharded blockchain network.

As described above, the latency (T$_{latency}$) represents the time from when a transaction is applied to the blockchain network until it becomes an irreversible state through a consensus process. The transaction applied to the blockchain network can be placed in one of multiple shards. For example, the transaction may be placed in a shard according to the last bit of the sender's address according to the shard distribution technique. And, as shown in FIG. 5, the transaction may first go through intra shard consensus within the placed shards, and then be combined into the blockchain through a final shard consensus process by multiple shards.

As indicated in Equation 3, the latency (T$_{latency}$) of a transaction can be calculated as the sum of the block interval (T$^I$) and the total consensus time (T$^k_{con}$). And referring to FIG. 5, the total consensus time (T$^k_{con}$) can be calculated as the sum of the intra-shard consensus time (T$^k_{intra}$) and the final shard consensus time (T$^k_{final}$) according to Equation 4.

$$T_{con}{}^k = T_{intra}{}^k + T_{final}{}^k \quad \text{[Equation 4]}$$

In addition, each of the intra-shard consensus time (T$^k_{intra}$) and the final shard consensus time (T$^k_{final}$) includes a message propagation time and a message verification time, and can be calculated by Equations 5 and 6.

$$T_{intra}{}^k = T_{in\_prop}{}^k + T_{in\_val}{}^k \quad \text{[Equation 5]}$$

$$T_{final}{}^k = T_{f\_prop}{}^k + T_{f\_val}{}^k \quad \text{[Equation 6]}$$

T$^k_{in\_prop}$ and T$^k_{in\_val}$ are the message propagation time and verification time in the intra-shard consensus process, respectively, and T$^k_{f\_prop}$ and T$^k_{f\_val}$ are the message propagation time and verification time in the final consensus process, respectively.

Referring to FIG. 5, the intra-shard consensus time (T$^k_{intra}$) consists of a pre-prepare phase (Pre-Prepare), a prepare phase (Prepare), and an approval phase (Commit).

In the pre-prepare phase, a primary node (or referred to as leader node) of each shard receives M requests of a pre-designated batch size, generates a pre-prepare message, and propagates one pre-prepare message to each of the N$_i$−1 replica nodes in the shard. Then the primary node generates N$_i$−1 Message Authentication Codes (hereinafter referred to as MAC), and each replica node performs an operation on the MAC to verify the block.

In the prepare phase, each replica node exchanges a verification message for whether the pre-prepare message is valid, with other replica nodes. Here, each replica node generates N$_i$−1 MACs, and verifies N$_i$−2 MACs.

In the approval phase, all nodes in the shard exchange messages for verification. In particular, the primary node processes N$_i$−1 messages for transmission and reception of each message.

After the approval phase, the primary node and replica nodes reply the result of intra-shard consensus to the Directory Committee (hereinafter referred to as DC) for the final consensus. At this time, the primary node and the replica nodes create C MACs, which C is the number of DCs per each request. That is, the primary node performs a total of M signature confirmations and M(1+C)+4(N$_i$−1) MAC operations, and the replica node performs M signature confirmations and CM+4($N_i$−1) MAC operations.

Therefore, the total processing time of the primary node of the i-th shard is $$T^i_{in\_primary} = \frac{M\theta + [M(1+C) + 4(N_i - 1)]\alpha}{c_{i,p}},$$

and the total processing time of the replica node is $$T^i_{in\_replica} = \frac{M\theta + [CM + 4(N_i - 1)]\alpha}{c_{i,r}}.$$

Here, $c_{i,p}$ and $c_{i,r}$ are the operation speeds of the primary node and the replica node of the i-th shard. Since the intra-shard consensus is processed in parallel in each shard, the delay time is determined by the shard that processed the intra-shard consensus last, and the verification processes of the primary node and replica nodes are also processed in parallel. Accordingly, the verification time ($T^k_{in\_val}$) for each request message in the intra-shard consensus can be calculated by Equation 7.

$$T^k_{in\_val} = \frac{1}{M} \max_{i=1,\ldots,k}\left(T^i_{in\_replica}, T^i_{in\_primary}\right) \quad \text{[Equation 7]}$$

In addition, the message propagation time is the time it takes to deliver the message to the destination node during the consensus process. Here, a time limit (ξ) may be set to prevent the consensus process from becoming excessively long due to the non-response of nodes in each consensus step. Replica nodes that do not respond within the time limit (ξ) are considered to have a rejection opinion in the corresponding consensus step. Therefore, the propagation time ($T^k_{in\_prop}$) in each consensus step in the shard can be calculated by Equation 8.

$$T^k_{in\_prop} = \frac{1}{M}\left(T^k_{in\_preprepare} + T^k_{in\_prepare} + T^k_{in\_commit}\right) = \quad \text{[Equation 8]}$$
$$\frac{1}{M}\max_{i=1,\ldots,k}\left(\min\left\{\max_{j \neq p}\frac{MB}{R_{n_{i,p},n_{i,j}}}, \zeta\right\} + \right.$$
$$\left. \min\left\{\max_{j \neq l}\frac{MB}{R_{n_{i,j},n_{i,l}}}, \zeta\right\} + \min\left\{\max_{j \neq l}\frac{MB}{R_{n_{i,j},n_{i,l}}}, \zeta\right\}\right)$$

Blocks approved in the intra-shard consensus of each of the k shards are propagated to the DC for the final consensus. DC verifies the kM signatures and MAC received from each shard. At this time, DC nodes proceed with PBFT consensus again like the intra-shard consensus and propagate the merged block to all nodes. The verification times of the primary node and the replica nodes of the DC are as shown in Equation 9.

$$T^k_{f\_primary} = \frac{kM\theta + [kM + 4(C-1) + (N-C)M]\alpha}{c_{f,p}} \quad \text{[Equation 9]}$$
$$T^k_{f\_replica} = \frac{kM\theta + [4(C-1) + (N-C)M]\alpha}{c_{f,r}}$$

(wherein, $c_{f,p}$ and $c_{f,r}$ are the operation speeds of the primary node and the replica node of the DC.)

Accordingly, in the final consensus, the verification time ($T^k_{f\_val}$) for each request is calculated by Equation 10.

$$T^k_{f\_val} = \frac{1}{M}\max\left(T^k_{f\_primary}, T^k_{f\_replica}\right) \quad \text{[Equation 10]}$$

The message propagation time in DC can be calculated, in the same way as the propagation time ($T^k_{f\_prop}$) in intra-shard consensus, as in Equation 11.

$$T^k_{f\_prop} = \quad \text{[Equation 11]}$$
$$\frac{1}{M}\left(T^k_{f\_request} + T^k_{f\_preprepare} + T^k_{f\_prepare} + T^k_{f\_commit} + T^k_{reply}\right) =$$
$$\frac{1}{M}\left(\min\left\{\max_{i=1,\ldots,k; j=1,\ldots,N_i; l=1,\ldots,C}\frac{MB}{R_{n_{i,j},n_{f,l}}}, \zeta\right\} + \right.$$
$$\min\left\{\max_{l \neq p}\frac{MB}{R_{n_{i,j},n_{f,l}}}, \zeta\right\} + \min\left\{\max_{u \neq p, u,=1,\ldots,C}\frac{MB}{R_{n_{f,u},n_{f,l}}}, \zeta\right\} +$$
$$\left.\min\left\{\max_{u \neq l}\frac{MB}{R_{n_{f,u},n_{f,l}}}, \zeta\right\} + \min\left\{\max_{i=1,\ldots,k}\frac{kMB}{R_{n_{f,u},n_{i,j}}}, \zeta\right\}\right)$$

(wherein, $n_{f,p}$ and $n_{f,r}$ represent the primary node and replica node numbers in DC, and $R_{n_{i,j},n_{f,l}}$, $R_{n_{f,p},n_{f,l}}$, $R_{n_{f,u},n_{f,l}}$, $R_{n_{f,u},n_{f,l}}$, $R_{n_{f,u},n_{i,j}}$ represent the transmission rates between nodes designated by subscripts.)

$T^k_{f\_request}$ is the propagation time consumed for the DC to receive blocks created during the intra-shard consensus process, and $T^k_{f\_reply}$ is the time consumed to broadcast the finally merged block to the entire blockchain network.

Finally, the total consensus time ($T^k_{con}$) consumed in the sharded blockchain network can be calculated by Equation 12.

$$T^k_{con} = \quad \text{[Equation 12]}$$
$$T^k_{intra} + T^k_{final} = \left(T^k_{in\_prop} + T^k_{in\_val}\right) + \left(T^k_{f\_prop} + T^k_{f\_val}\right) = \frac{1}{M}$$
$$\left(\max_{i=1,\ldots,k}\left(T^i_{in\_replica}, T^i_{in\_primary}\right) + \max\left(T^k_{f\_primary}, T^k_{f\_replica}\right)\right) +$$
$$\frac{1}{M}\max_{i=1,\ldots,k}\left(\min\left\{\max_{j \neq p}\frac{MB}{R_{n_{i,p},n_{i,j}}}, \zeta\right\} + \right.$$
$$\left.\min\left\{\max_{j \neq l}\frac{MB}{R_{n_{i,j},n_{i,l}}}, \zeta\right\} + \min\left\{\max_{j \neq l}\frac{MB}{R_{n_{i,j},n_{i,l}}}, \zeta\right\}\right) +$$
$$\frac{1}{M}\left(\min\left\{\max_{i=1,\ldots,k; j=1,\ldots,N_i; l=1,\ldots,C}\frac{MB}{R_{n_{i,j},n_{i,l}}}, \zeta\right\} + \right.$$
$$\min\left\{\max_{l \neq p}\frac{MB}{R_{n_{i,j},n_{f,l}}}, \zeta\right\} + \min\left\{\max_{u \neq p, u,=1,\ldots,C}\frac{MB}{R_{n_{f,u},n_{f,l}}}, \zeta\right\} +$$
$$\left.\min\left\{\max_{u \neq l}\frac{MB}{R_{n_{f,u},n_{f,l}}}, \zeta\right\} + \min\left\{\max_{i=1,\ldots,k}\frac{kMB}{R_{n_{f,u},n_{i,j}}}, \zeta\right\}\right)$$

Since the consensus delay time of the transaction must be completed within the continuous block interval (u) in order to satisfy the finality feature of the blockchain, the first constraint (Constraint1) of Equation 3 above must be satisfied.

Meanwhile, in the consensus algorithm based on PBFT, when there are a total of N blockchain nodes, the consensus process can operate normally even if there are f malicious nodes that satisfy the condition of (3f+1)≤N. And in a sharded blockchain network to which sharding is applied, all nodes are distributed into k shards, and DC responsible for the final consensus consists of C (C=|N/(k+1)|) nodes. That is, N validators are equally distributed as a total of k+1 and follow the PBFT algorithm.

Among the two security conditions ($S_l$, l=1,2) in the PBFT algorithm, the first security condition (S1) is a condition in which normal blocks are all generated by preventing malicious nodes in all shards from forming a ratio of 1/3 or more in each shard, and can be defined by Equation 13.

$$S_1 = \frac{N(1-3p)-1}{3Np+1} \quad \text{[Equation 13]}$$

(wherein, p is the ratio of malicious nodes.)

In the PBFT algorithm, the conditions of $(3f_i+1) \leq N_i$ and $(3f_{iC}+1) \leq C$ should be satisfied for the total number of nodes ($N_i$) and the number of malicious nodes ($f_i$) in a shard, and the number of malicious nodes of DC ($f_{DC}$).

When there are Np malicious nodes in the whole network, the most serious case is when all the malicious nodes are concentrated in DC. In this case, each shard and DC must satisfy the conditions of $3Np+1 \leq N_i$ and $3Np+1 \leq N_i$. In addition, C=|N/(k+1)|, $N_i \geq |(N-C)/k|$, and since $N_i$ is greater than C, $3Np+1 \leq |N/(k+1)| < N/(k+1)$ becomes a security condition. Rearranging this for k, k<(N(1−3p)−1)/(3Np+1), therefore, the first security condition ($S_1$) can be derived as in Equation 13.

The second security condition ($S_2$) is a condition that prevents malicious nodes from forming a ratio of 2/3 or more in all shards so that a tampered block is not formed, and can be defined by Equation 14.

$$S_2 = \frac{2N}{3(Np+1)} - 1 \quad \text{[Equation 14]}$$

As described above, in the PBFT algorithm, malicious nodes must not occupy a ratio of 2/3 or more in each shard and DC. Therefore, $Np \leq (2/3)N_i-1$ and $Np \leq (2/3)C-1$ must be satisfied, and finally, by the condition that $Np \leq (2/3)C-1=(2/3)|N/(k+1)|-1<2N/3(k+1)-1$, a formula k<2N/(3(Np+1))−1 is derived. Therefore, the second security condition ($S_2$) can be derived as in Equation 14.

Meanwhile, it can be assumed that an average of Np malicious nodes exist in the blockchain network 20 according to a probability (p) that each node acts maliciously.

However, in the apparatus for managing network according to the present embodiment, the network setting unit 160 cannot determine which node is a malicious node. Therefore, the agent unit 162 of the network setting unit 160 needs to estimate the malicious node ratio based on the previously obtained consensus process record (H), and to adjust the number of shards according to the security conditions ($S_1$, $S_2$).

To estimate the malicious node probability (p), first, a degree of inconsistency of consensus of shards is calculated using the normalized entropy value based on the consensus process record (H). If, in the process of verifying whether a block is normal or abnormal, the validators provided exactly half and half opinions, the degree of inconsistency becomes 1. If the consensus result is unanimous, the degree of inconsistency becomes 0. When $p^i_m$ and $p^i_M$ are a ratio of the minority consensus opinion and a ratio of the majority consensus opinion, respectively, the ratio of the majority consensus opinion ($p^i_M$) is calculated as $1-p^i_m$. Accordingly, in the consensus process of the i-th shard, the entropy value can be calculated by Equation 15.

$$I_i = p^i_m \log_2(p_m^i) - (1-p_m^i)\log_2(1-p_m^i)$$

$$I_{DC} = -p_m^{DC} \log_2(p_m^{DC}) - (1-p_m^{DC})\log_2(1-p_m^{DC}) \quad \text{[Equation 15]}$$

(wherein, $I_i$ and $I_{DC}$ represent the degree of inconsistency of consensus in the i-th shard and DC, respectively.)

And a total consensus reliability U, which is an average of the normalized entropy values of each shard, is calculated as in Equation 16.

$$U = \frac{1}{k+1}\left(\left(\sum_{i=1}^{k} I_i\right) + I_{DC}\right) \quad \text{[Equation 16]}$$

However, as to the ratio of malicious nodes in the entire blockchain network, since there is no accurate information about which nodes are honest or malicious, only the ratio of minority and majority opinions can be known for each shard. Therefore, assuming that the average value of the degree of inconsistency of each shard is almost similar to the degree of inconsistency of the entire network, the total malicious node ratio ($\bar{p}$) can be estimated as in Equation 17.

$$U \approx -\dot{p} \log_2 \dot{p} - (1-\dot{p})\log_2(1-\dot{p})$$

$$\bar{p} = \min\{\dot{p}, (1-\dot{p})\} \quad \text{[Equation 17]}$$

As to the estimated value, assuming that normal, non-malicious nodes occupy more than half in the entire network, the smaller of $\dot{p}$ and $(1-\dot{p})$ can be estimated as the malicious node ratio ($\bar{p}$).

The two constraints of Equation 3 above are not only used to prevent a decrease in latency ($T_{latency}$) or security that may occur as a result of maximizing TPS, but also make the agent unit 162 not select a meaningless action (A), so there is an advantage in that the agent unit 162 implemented with an artificial neural network can converge more quickly during reinforcement learning. That is, it can improve the learning speed of the agent unit 162.

If the action ($A^t$) determined in the agent unit 162 satisfies two constraint conditions, the environment analysis unit 163 calculates the reward ($R^t$) at the epoch (t) as in Equation 18 based on the TPS of Equation 2, but, if the determined action ($A^t$) does not satisfy the two constraints, it calculates the reward ($R^t$) as 0.

$$R^t = R(S^t, A^t) = \frac{k\lfloor(B-B_H)/b\rfloor}{T^t} \quad \text{[Equation 18]}$$

(wherein, $B_H$ is a block header size.)

At the agent unit 162, reinforcement learning may be performed such that the reward ($R^t$) according to Equation 18 is maximized. Here, the reward ($R^t$) may be an action value function (Q) of Equation 3.

However, in this case, the update of the agent unit 162 may occur very frequently, and the result may vibrate or diverge during learning and thus may not converge.

Accordingly, by applying the structure of the deep Q network to the agent unit 162, the agent unit 162 may be configured to include a main Q network updated every epoch and a target Q network updated at a pre-designated period.

As such, if the agent unit 162 includes the main Q network and the target Q network, the main Q network selects the number of shards (K*) set in the current epoch (t) and the action (A') in the state information (S') according to Equation 19 modified from Equation 3.

$$A^t = \arg\max_A Q(S^t, A^t; \omega) \quad \text{[Equation 19]}$$

(wherein, ω is the weight of the main Q network.)

Here, the main Q network must select an action (A') so as to satisfy the two constraints of Equation 3. In addition, if a random action probability ($p_\varepsilon$) to select a random action in a state where reinforcement learning is not completely performed is greater than or equal to the pre-designated random selection probability (ε), the main Q network can arbitrarily select the block size (B), the block interval (T') and the number of shards (K*) included in the action (A=[B, T', K*]). That is, a random action may be selected. However, the number of shards (K*) must be selected so as to satisfy the two constraints of Equation 3.

Accordingly, the environment analysis unit 163 observes the reward (R') for executing the action (A') selected in the main Q network and the state information ($S^{t+1}$) at the next epoch (t+1). Then, it may estimate the ratio of malicious nodes ($\hat{p}$) from the observed state information ($S^{t+1}$), update the number of shards (K*), and transmit it back to the main Q network.

Here, it has been described that the agent unit 162 selects an action (A') that maximizes TPS while satisfying two constraint conditions among the estimated multiple actions (A), but in some cases, the environment analysis unit 163 may select one action (A').

The state information (S'), the action (A') selected in the main Q network, the reward (R') obtained from the environment analysis unit 163 and the state information ($S^{t+1}$) in the next epoch (t+1) are stored as a transition set ([S', A', R', $S^{t+1}$]) in the memory unit 161.

A minibatch of a plurality of transition sets ([$S^x$, $A^x$, $R^x$, $S^{x+1}$]) previously stored in the memory unit 161 is sampled in a pre-designated manner (for example, randomly), and a function ($y^x$) for optimizing the target Q network is set by Equation 20.

$$y^x = \begin{cases} R^x & \text{if episode terminates at step } x+1 \\ R^x + \gamma \max_{A'} Q^*(S^{x+1}, A'; \omega^*) & \text{otherwise} \end{cases} \quad \text{[Equation 20]}$$

(wherein, ω* is the weight of the target Q network, A' represents an action selected in the target Q network, and Q* is an action value function of the target Q network and can be calculated by $$Q^*(S, A) = \max_\pi \mathbb{E}[\Sigma_{t=0}^\infty \gamma^t \mathfrak{R}(S^t, A^t) | S^{(0)} = S, A^{(0)} = A, \pi],$$

wherein, γ(γ∈(0,1)) is a discount factor, and π represents a behavior policy.)

The target Q network may be updated at a pre-designated period, and the main Q network may be updated by back-propagating the loss such that the loss (L(ω)) calculated by Equation 21 is minimized.

$$L(w) = E\left[R^x + \gamma \max_{A'} Q^*(S^{x+1}, A'; \omega^*) - Q(S^x, A^x; \omega)\right)^2\right] \quad \text{[Equation 21]}$$

According to Equation 21, the loss (L(ω)) can be obtained in the form of an energy function, by sampling, in a pre-designated manner, a minibatch of a plurality of transition sets ([$S^x$, $A^x$, $R^x$, $S^{x+1}$]) stored in the memory unit, and based on a reward ($R^x$) of the sampled transition sets and a TPS difference by the action ($A^x$, A') selected according to each state information ($S^x$, $S^{x+1}$).

The target Q network learned by backpropagating the loss is replicated to the main Q network, so that the main Q network can also be updated.

Figure 6:
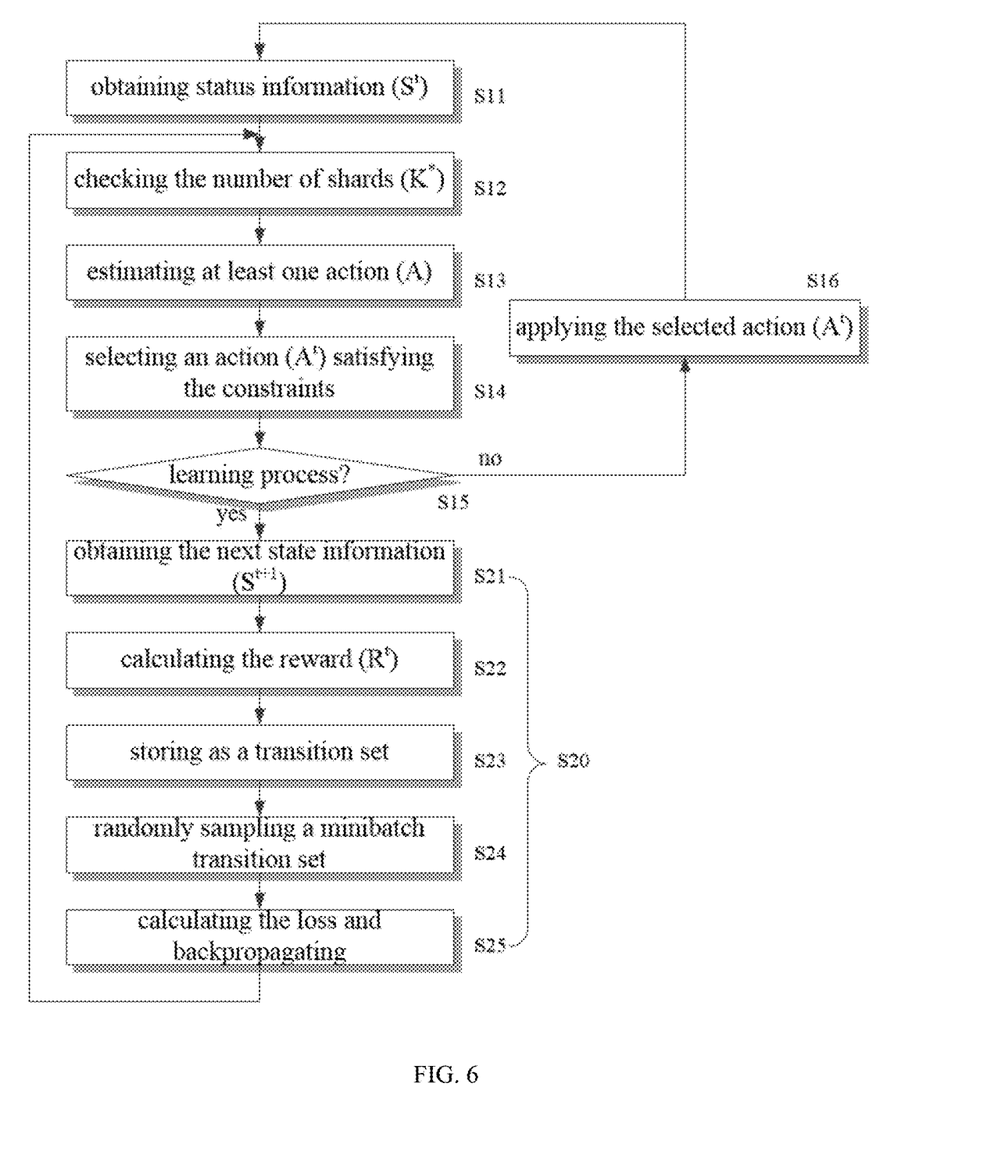
FIG. 6 shows a method for managing a blockchain network according to an embodiment of the present disclosure.

FIG. 6 shows a method for managing a blockchain network according to an embodiment of the present disclosure.

Referring to FIG. 2 to FIG. 5, the method for managing blockchain network of FIG. 6 is described as follows. First, the state information (S') at the current epoch (t) is acquired (S11). Here, the state information (S') includes the inter-node data transmission rate (R), computing resources (c) of each node, consensus process record (H) and malicious node probability ($\hat{p}$), as an environment of the blockchain network 20. Here, the malicious node probability (p) can be estimated by calculating a degree of inconsistency of consensus of shards using the normalized entropy value based on the consensus process record (H).

Then, the number of shards (K*) set in the current blockchain network 20 is checked (S12).

State information (S') is input as input data to the artificial neural network in which the pattern estimation method is learned, and at least one action (A) corresponding to the state information (S') is estimated and obtained (S13). At this time, each element included in the state information (S') may be size-transformed and combined to be used as input data of the artificial neural network. The artificial neural network may be learned according to a deep reinforcement learning method, and may be configured with, for example, a deep Q network.

Here, each of the at least one action (A) includes a block size (B), a block interval (T') and the number of shards (K).

When the at least one action (A) is obtained, one action (A') among the obtained at least one action (A) is selected according to Equation 3 ($S_{14}$). According to Equation 3, an action (At) is selected that can maximize TPS while satisfying the two constraints of the latency ($T_{latency}$) and the maximum number of security shards ($\hat{K}$) required to maintain two pre-designated security conditions ($S_1$, $S_2$).

When the action (A') is selected, it is determined whether the artificial neural network is a learning process to be learned (S15). If it is determined that it is not a learning process, the block size (B), block interval (T'), and number of shards (K*) included in the selected action (A') are applied to the blockchain network 20 (S16).

However, if the current method for managing blockchain network is a learning process to be learned, the state information ($S^{t+1}$) in the next epoch (t+1) of the blockchain network 20 is obtained that changes as the selected action (A') is applied (S21). Then, the reward (R') is calculated (S22).

Accordingly, the state information (S') of the blockchain network 20 obtained at each epoch interval, the corresponding action (A'), and next state information ($S^{t+1}$) and reward (R') according to the action (A') are matched and stored together as a transition set ([S', A', R', $S^{t+1}$]) (S23).

Then, a minibatch is sampled in a pre-designated manner from a plurality of stored transition sets ([$S^x$, $A^x$, $R^x$, $S^{x+1}$]) (S24). When the transition sets ([$S^x$, $A^x$, $R^x$, $S^{x+1}$]) sampled into minibatch are obtained, the action (A') is estimated corresponding to the state information ($S^x$) of the transition sets ($[S^x, A^x, R^x, S^{x+1}]$) sampled into minibatch, the reward and the loss are calculated according to Equation 20 and Equation 21, and the artificial neural network for estimating an action is learned by backpropagating the calculated loss (S25).

If the artificial neural network is implemented with a deep Q network, a neural network that selects an action ($A^t$) from the state information ($S^t$) at the current epoch (t) and a neural network that is learned by estimating the loss in a pre-designated way from transition sets ($[S^x, A^x, R^x, S^{x+1}]$) sampled into a minibatch can be divided into a main Q network and a target Q network, respectively. Here, the target Q network learned by backpropagating the loss is replicated to the main Q network, so that the main Q network can also be updated.

A method according to an embodiment of the disclosure can be implemented as a computer program stored in a medium for execution on a computer. Here, the computer-readable medium can be an arbitrary medium available for access by a computer, where examples can include all types of computer storage media. Examples of a computer storage medium can include volatile and non-volatile, detachable and non-detachable media implemented based on an arbitrary method or technology for storing information such as computer-readable instructions, data structures, program modules, or other data, and can include ROM (read-only memory), RAM (random access memory), CD-ROM's, DVD-ROM's, magnetic tapes, floppy disks, optical data storage devices, etc.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present invention is to be defined by the technical spirit set forth in the appended scope of claims.

What is claimed is:

1. An apparatus for managing sharded blockchain network comprising:
   one or more processors; and
   memory storing instructions that, when executed by the one or more processors, cause the apparatus to:
   obtain state information ($S^t$) including an inter-node data transmission rate (R) and computing resources (c) of each node in a current epoch (t) of a shard-based blockchain network in which N nodes are distributed to at least one shard, a consensus process record (H) of each node in each shard and a ratio of malicious nodes ($p$),
   estimate at least one action (A) each including block size (B), block interval ($T^t$) and number of shards (K) corresponding to the state information ($S^t$) by using an artificial neural network in which a pattern estimation method has been previously learned,
   select one action ($A^t$) among the estimated at least one action (A) that maximizes a processing speed (TPS) while satisfying a first constraint that the latency ($T_{latency}$) is less than or equal to a successive block interval ($uT^t$) and a second constraint that the number of shards (K) is within a pre-designated maximum number of secure shards ($\check{K}$) required to maintain security, and
   apply the one action ($A^t$) to the shard-based blockchain network.

2. The apparatus according to claim 1, wherein the latency ($T_{latency}$) is calculated as a sum of the block interval ($T^t$) and a total consensus time ($T^k_{con}$) consumed in a sharded blockchain network having k shard blocks, and
   the total consensus time ($T^k_{con}$) is calculated as a sum of an intra-shard consensus time ($T^k_{intra}$) and a final shard consensus time ($T^k_{final}$).

3. The apparatus according to claim 2, wherein the intra-shard consensus time ($T^k_{intra}$) is calculated as a sum of a message propagation time ($T^k_{in\_prop}$) in an intra-shard consensus process and a verification time ($T^k_{in\_val}$) in the intra-shard consensus process, and
   the final shard consensus time ($T^k_{final}$) is calculated as a sum of a message propagation time ($T^k_{f\_prop}$) in a final consensus process and a verification time ($T^k_{f\_val}$) in the final consensus process.

4. The apparatus according to claim 3, wherein the total consensus time ($T^k_{con}$) is calculated by $$T^k_{con} = T^k_{intra} + T^k_{final} = (T^k_{in\_prop} + T^k_{in\_val}) + (T^k_{f\_prop} + T^k_{f\_val}) =$$
$$\frac{1}{M}\left(\max_{i=1,\ldots,k}(T^i_{in\_replica}, T^i_{in\_primary}) + \max(T^k_{f\_primary}, T^k_{f\_replica})\right) +$$
$$\frac{1}{M}\max_{i=1,\ldots,k}\left(\min\left\{\max_{j\neq p}\frac{MB}{R_{n_{i,p},n_{i,j}}}, \zeta\right\} +\right.$$
$$\left.\min\left\{\max_{j\neq l}\frac{MB}{R_{n_{i,j},n_{i,l}}}, \zeta\right\} + \min\left\{\max_{j\neq l}\frac{MB}{R_{n_{i,j},n_{i,l}}}, \zeta\right\}\right) +$$
$$\frac{1}{M}\left(\min\left\{\max_{i=1,\ldots,k;j=1,\ldots,N_s;l=1,\ldots,cR_{n_{i,j},n_{j,l}}}\frac{MB}{}, \zeta\right\} +\right.$$
$$\min\left\{\max_{i\neq p}\frac{MB}{R_{n_{f,p},n_{f,l}}}, \zeta\right\} + \min\left\{\max_{u\neq p;l=1,\ldots,cR_{n_{f,u},n_{j,i}}}\frac{MB}{}, \zeta\right\} +$$
$$\left.\min\left\{\max_{u\neq l}\frac{MB}{R_{n_{f,u},n_{f,i}}}, \zeta\right\} + \min\left\{\max_{i=1,\ldots,k}\frac{kMB}{R_{n_{f,u},n_{i,j}}}, \zeta\right\}\right)$$

$\qquad$ Equation wherein, M represents batch size of a requested block,
   $T^i_{in\_primaly}$ and $T^i_{in\_replica}$ represent processing times of a primary node and a replica node in the i-th shard,
   $T^k_{f\_primary}$ and $T^k_{f\_replica}$ represent processing times of a priority node and a replica node of DC (Directory Committee) that perform the final consensus process on blocks approved in the intra-shard consensus process of each k shards,
   $n_{f,p}$ and $n_{f,r}$ represent primary node number and replica node number in DC, and $R_{n_{i,j},n_{f,l}}$, $R_{n_{f,p},n_{f,l}}$, $R_{n_{f,u},n_{f,l}}$, $R_{n_{f,u},n_{f,l}}$, $R_{n_{f,u},n_{i,j}}$ represent transmission rates between nodes designated by subscripts, and
   $\xi$ is a predesignated response time limit of a node.

5. The apparatus according to claim 1, wherein the shard-based blockchain network performs consensus according to Byzantine fault tolerance algorithm technique.

6. The apparatus according to claim 5, wherein the maximum number of security shards ($\check{K}$) is set to a maximum value among values smaller than each of
   a first security condition ($S_1$) indicating the number of shards that makes the ratio of malicious nodes in each shard less than 1/3 and
   a second security condition ($S_2$) indicating the number of shards that makes the ratio of malicious nodes in each shard less than 2/3.

7. The apparatus according to claim 6, wherein the first security condition ($S_1$) is calculated by $$S_1 = \frac{N(1-3p)-1}{3Np+1} \quad \text{Equation 5}$$

wherein, N represents the total number of nodes, and p represents the ratio of malicious nodes, and
the second security condition ($S_2$) is calculated by $$S_2 = \frac{2N}{3(Np+1)} - 1. \quad \text{Equation}$$

8. The apparatus according to claim 1, wherein the instructions, when executed by the one or more processors, cause the apparatus to:
estimate a plurality of actions (A) corresponding to the state information ($S^t$) by comprising the artificial neural network in which a pattern estimation method has been previously learned, satisfies the first and second constraints among the estimated plurality of actions (A), and selects an action ($A^t$) that maximizes TPS; and
apply the selected action ($A^t$) to the sharded blockchain network to estimate a state information ($S^{t+1}$) and a reward ($R^t$) in next epoch (t+1).

9. The apparatus according to claim 8, wherein the instructions, when executed by the one or more processors, cause the apparatus to:
includes a memory unit in which the state information ($S^t$), the selected action ($A^t$), and the state information ($S^{t+1}$) and the reward ($R^t$) at the next epoch (t+1) according to the selected action ($A^t$) are matched and stored as a transition set ([$S^t$, $A^t$, $R^t$, $S^{t+1}$]),
samples, in a pre-designated manner, a minibatch of a plurality of transition sets ([$S^x$, $A^x$, $R^x$, $S^{x+1}$]) stored in the memory unit during learning of the agent unit,
estimates a loss based on a reward ($R^x$) of the sampled transition set and a TPS difference by the action ($A^x$, $A^t$) selected according to each state information ($S^x$, $S^{x+1}$), and backpropagates the estimated loss.

10. The apparatus according to claim 1, wherein the TPS is calculated by $$\mathcal{T}(B, T^I) = \frac{k \lfloor B/b \rfloor}{T^I} \quad \text{Equation}$$

wherein, k represents number of shards, b represents an average transaction size, and represents a floor function.

11. A method for managing sharded blockchain network, including the steps of:
obtaining state information ($S^t$) including an inter-node data transmission rate (R) and computing resources (c) of each node in a current epoch (t) of a shard-based blockchain network in which N nodes are distributed to at least one shard, a consensus process record (H) of each node in each shard and a ratio of malicious nodes ($p$);
estimating at least one action (A) each including a block size (B), a block interval ($T^I$) and the number of shards (K) corresponding to the state information ($S^t$) by using an artificial neural network in which a pattern estimation method has been previously learned;
selecting one action ($A^t$) among the estimated at least one action (A) that maximizes a processing speed (transactions per second: hereinafter referred to as TPS) while satisfying a first constraint that the latency ($T_{latency}$) is less than or equal to a successive block interval ($uT^I$) and a second constraint that the number of shards (K) is within a pre-designated maximum number of secure shards ($\acute{K}$) required to maintain security; and
applying the block size (B), block interval ($T^I$) and number of shards (K*) of the selected action ($A^t$) to the shard-based blockchain network.

12. The method according to claim 11, wherein the latency ($T_{latency}$) is calculated as a sum of the block interval ($T^I$) and a total consensus time ($T^k_{con}$) consumed in a sharded blockchain network having k shard blocks, and
the total consensus time ($T^k_{con}$) is calculated as a sum of an intra-shard consensus time ($T^k_{intra}$) and a final shard consensus time ($T^k_{final}$).

13. The method according to claim 12, the intra-shard consensus time ($T^k_{intra}$), is calculated as a sum of a message propagation time ($T^k_{in\_prop}$) in an intra-shard consensus process and a verification time ($T^k_{in\_val}$) in the intra-shard consensus process, and
the final shard consensus time ($T^k_{final}$) is calculated as a sum of a message propagation time ($T^k_{f\_prop}$) in a final consensus process and a verification time ($T^k_{f\_val}$) in the final consensus process.

14. The method according to claim 13, wherein the total consensus time ($T^k_{con}$) is calculated by $$T^k_{con} = T^k_{intra} + T^k_{final} = (T^k_{in\_prop} + T^k_{in\_val}) + (T^k_{f\_prop} + T^k_{f\_val}) = \quad \text{Equation}$$

$$\frac{1}{\mathcal{M}}\left(\max_{i=1,\ldots,k}(T^i_{in\_replica}, T^i_{in\_primary}) + \max(T^k_{f\_primary}, T^k_{f\_replica})\right) +$$

$$\frac{1}{\mathcal{M}} \max_{i=1,\ldots,k}\left(\min\left\{\max_{j \neq p}\frac{\mathcal{M}B}{R_{n_{i,p},n_{i,j}}}, \zeta\right\} +\right.$$

$$\min\left\{\max_{j \neq l}\frac{\mathcal{M}B}{R_{n_{i,j},n_{i,l}}}, \zeta\right\} + \min\left\{\max_{j \neq l}\frac{\mathcal{M}B}{R_{n_{i,j},n_{i,l}}}, \zeta\right\}\right) +$$

$$\frac{1}{\mathcal{M}}\left(\min\left\{\max_{i=1,\ldots,k; j=1,\ldots,N_s; l=1,\ldots,C}\frac{\mathcal{M}B}{R_{n_{i,j},n_{j,l}}}, \zeta\right\} +\right.$$

$$\min\left\{\max_{i \neq p}\frac{\mathcal{M}B}{R_{n_{f,p},n_{f,l}}}, \zeta\right\} + \min\left\{\max_{u \neq p; l=1,\ldots,C}\frac{\mathcal{M}B}{R_{n_{f,u},n_{j,i}}}, \zeta\right\} +$$

$$\min\left\{\max_{u \neq l}\frac{\mathcal{M}B}{R_{n_{f,u},n_{f,i}}}, \zeta\right\} + \min\left\{\max_{i=1,\ldots,k}\frac{k\mathcal{M}B}{R_{n_{f,u},n_{i,j}}}, \zeta\right\}\right)$$

wherein, M represents batch size of a requested block,
$T^i_{in\_primary}$ and $T^i_{in\_replica}$ represent processing times of a primary node and a replica node in the i-th shard,
$T^k_{f\_primary}$ and $T^k_{f\_replica}$ represent processing times of a priority node and a replica node of DC (Directory Committee) that perform the final consensus process on blocks approved in the intra-shard consensus process of each k shards,
$n_{f,p}$ and $n_{f,r}$ represent primary node number and replica node number in DC, and $R_{n_{i,j},n_{f,l}}$, $R_{n_{f,p},n_{f,l}}$, $R_{n_{f,u},n_{f,l}}$, $R_{n_{f,u},n_{f,l}}$, $R_{n_{f,u},n_{i,j}}$ represent transmission rates between nodes designated by subscripts, and
$\xi$ is a predesignated response time limit of a node.

15. The method according to claim 11, wherein the shard-based blockchain network performs consensus according to Byzantine fault tolerance algorithm technique.

16. The method according to claim 15, wherein the maximum number of security shards ($\acute{K}$) is set to a maximum value among values smaller than each of
- a first security condition ($S_1$) indicating the number of shards that makes the ratio of malicious nodes in each shard less than 1/3 and
- a second security condition ($S_2$) indicating the number of shards that makes the ratio of malicious nodes in each shard less than 2/3.

17. The method according to claim 16, wherein the first security condition ($S_1$) is calculated by $$S_1 = \frac{N(1-3p)-1}{3Np+1} \quad \text{Equation}$$

wherein, N represents the total number of nodes, and p represents the ratio of malicious node, and
the second security condition ($S_2$) is calculated by $$S_2 = \frac{2N}{3(Np+1)} - 1. \quad \text{Equation}$$

18. The method according to claim 11, wherein the method for managing sharded blockchain network further includes a step of learning for making the artificial neural network learn, and
the step of learning includes the steps of:
- matching and storing the state information ($S^t$), the selected action ($A^t$), and a state information ($S^{t+1}$) and a reward ($R^t$) at next epoch (t+1) according to the selected action ($A^t$) as a transition set ([$S^t, A^t, R^t, S^{t+1}$]);
- sampling, in a pre-designated manner, a minibatch of a plurality of transition sets stored;
- sampling, in a pre-designated manner, a minibatch of a plurality of transition sets ([$S^x, A^x, R^x, S^{x+1}$]), and estimating a loss based on a reward ($R^x$) of the sampled transition set and a TPS difference by the action ($A^x, A'$) selected according to each state information ($S^x, S^{x+1}$); and
- backpropagating the estimated loss.

19. The method according to claim 11, wherein the TPS is calculated by $$T(B, T^I) = \frac{k \lfloor B/b \rfloor}{T^I} \quad \text{Equation}$$

wherein, k represents number of shards, b represents an average transaction size, and [ ] represents a floor function.

* * * * *